United States Patent
Rossigneux et al.

(10) Patent No.: US 9,124,618 B2
(45) Date of Patent: Sep. 1, 2015

(54) PROCESS OF RELIABILITY FOR THE GENERATION OF WARNING MESSAGES ON A NETWORK OF SYNCHRONIZED DATA

(71) Applicant: Cassidian Cybersecurity SAS, Elancourt (FR)

(72) Inventors: Valerian Rossigneux, Montigny le Bretonneux (FR); Julien Mascart, Versailles (FR)

(73) Assignee: Cassidian Cybersecurity SAS, Elancourt (FR)

( * ) Notice: Subject to any disclaimer, the term of this patent is extended or adjusted under 35 U.S.C. 154(b) by 0 days.

(21) Appl. No.: 14/193,126

(22) Filed: Feb. 28, 2014

(65) Prior Publication Data

US 2015/0026801 A1     Jan. 22, 2015

(30) Foreign Application Priority Data

Mar. 1, 2013  (FR) ...................................... 13 15844

(51) Int. Cl.
  *H04L 29/06*  (2006.01)
  *G08B 21/18*  (2006.01)

(52) U.S. Cl.
  CPC .............. *H04L 63/14* (2013.01); *G08B 21/182* (2013.01)

(58) Field of Classification Search
  CPC .............................. H04L 63/14; G08B 21/182
  USPC .............................. 726/22; 709/223; 340/506
  See application file for complete search history.

(56) References Cited

U.S. PATENT DOCUMENTS

| | | | | |
|---|---|---|---|---|
| 5,049,873 | A * | 9/1991 | Robins et al. | 370/254 |
| 5,715,294 | A * | 2/1998 | Pester, III | 379/32.03 |
| 6,158,025 | A * | 12/2000 | Brisse et al. | 714/48 |
| 8,041,799 | B1 * | 10/2011 | Usery et al. | 709/223 |
| 2004/0028003 | A1 * | 2/2004 | Diener et al. | 370/319 |
| 2004/0047324 | A1 * | 3/2004 | Diener | 370/338 |
| 2005/0010545 | A1 * | 1/2005 | Joseph | 707/1 |
| 2005/0089027 | A1 * | 4/2005 | Colton | 370/380 |
| 2005/0276217 | A1 * | 12/2005 | Gadgil et al. | 370/225 |
| 2006/0020686 | A1 * | 1/2006 | Liss et al. | 709/219 |
| 2009/0322510 | A1 * | 12/2009 | Berger et al. | 340/539.1 |
| 2010/0071053 | A1 * | 3/2010 | Ansari et al. | 726/12 |
| 2010/0102948 | A1 * | 4/2010 | Grohman et al. | 340/506 |
| 2010/0102973 | A1 * | 4/2010 | Grohman et al. | 340/584 |
| 2012/0154138 | A1 * | 6/2012 | Cohn et al. | 340/501 |
| 2014/0157405 | A1 * | 6/2014 | Joll et al. | 726/22 |
| 2014/0310243 | A1 * | 10/2014 | McGee et al. | 707/639 |

* cited by examiner

*Primary Examiner* — Haresh N Patel

(74) *Attorney, Agent, or Firm* — Miller, Matthias & Hull LLP

(57) ABSTRACT

The method for reliabilization of the supervision of a network comprises: acquisition of a set of events, said events comprising a time stamp corresponding with the emission time of said event; storage of the received events; storage of at least one scenario (SC) comprising a first sequence (S1) of events to be received within a time interval threshold (ΔTs) and a first condition (CD1) to be satisfied; detection of at least a part (pS2) of a received second sequence of events (S2) similar to the first sequence (S1); determination of a second emission time interval (ΔT3) of the second sequence (S2); verification that the first condition (CD1) of the scenario (SC) is satisfied in function of the determined emission time interval (ΔT3), the time interval threshold (ΔTs) of scenario (SC), and the first sequence (S1) and the second sequence (S2) received, and generation of a second status message (M2ET).

9 Claims, 2 Drawing Sheets

PROCESS OF RELIABILITY FOR THE GENERATION OF WARNING MESSAGES ON A NETWORK OF SYNCHRONIZED DATA

CROSS-REFERENCE TO RELATED APPLICATIONS

This application claims priority under the Paris Convention and 35 USC §119 to French Patent Application No. 13 21193, filed on Mar. 1, 2013.

FIELD OF THE DISCLOSURE

The domain of the invention is the domain of methods and supervision systems for networks and in particular the actions performed in these networks in order to guarantee their security. The invention relates to methods for identifying alarms emitted by network equipment for the protection of the network and methods for improving the rate of false alarms in supervision messages.

BACKGROUND OF THE DISCLOSURE

At the present time, the tools for supervising network infrastructures such as enterprise networks, administrative networks or specific community networks are highly complex.

From a first aspect, the complexity is the result of the growing number of interfacing devices having access to a given network. At the present time, the devices involved in accessing a given network are:
  nomadic devices such as smartphones, tablets;
  computers, workstations, portable computers;
  devices supporting the network such as commutating switches, routers, administrative servers, etc.

The growing number of devices creates increased complexity of the number of supervisory messages to be processed.

Another aspect concerns the quality of the network service, aimed in particular at improving the reliability and security of the network, which of course implies increased complexity of the administrative tools in order to eliminate all faults in a system.

Making the security of a network more reliable is even more important as the number of points from which the system is accessed increases with the number of devices mentioned in the first aspect.

Improving the reliable security of a network is the answer to the need to reduce the vulnerability of a network in the areas of applications, transmission protocols or intrusions for instance by pirating of encrypted keys or user passwords.

One of the dangers consists in letting an unauthorized person penetrate a network with the objective of causing harm, for instance by erasing data or stealing confidential information.

Because of this complexity, the tools have integrated correlators for processing in semi-automatic or automatic mode events occurring inside the network.

The correlators are capable of managing a set of events by analyzing for instance, their number, their redundancy, their nature, an expected sequence of a set among these events, the reception dates, emitters and receivers, etc.

These correlators are capable of assisting persons in their decision making by filtering and synthesizing all the emitted events.

More and more, correlators are taking the security aspects into account by identifying anomalies or irregularities in the reception of the received messages.

There are different types of solutions for detecting such anomalies. In the first place, we are mentioning the HIDS solution (the English language acronym means "Host Intrusion Detection System"), which enhances in particular the modifications of a system for detection of abnormal activities and gaps in security policy.

In the second place, the NIDS solution (the English language acronym means "Network Intrusion Detection System") for the detection of so-called "malicious" or pockmarked messages among the messages transiting through the system.

A third solution consists in using a firewall for detecting the use of unauthorized transmission ports in a given link.

Each envisaged solution comprises a common emission mechanism for alarm messages when an event occurs that can potentially endanger the security of the network or of the information transiting through the network. There are solutions such as, for instance, event journals of exploitation systems or applications where the emitted messages are not necessarily alarms but event notifications. There are numerous solutions comprising notification emission systems such as firewalls, anti-virus and other solutions.

In networks with real time constraints, for instance synchronized networks, the messages are in general time stamped. Time stamping improves in particular the routing protocols or the synchronization problems of a network. Network supervision devices do not use time stamping because the event correlators use the message arrival date to make a decision. In this way, messages can be classified chronologically, analyses can be performed and adequate decisions can be made, for instance, when a security failure is detected.

One major problem, resulting from the increased complexity of information systems and data networks, is that some anomalies significantly downgrade the analysis of events in synchronized networks. Among these anomalies we find incidents such as service interruptions, radio silence and too long latency times in addition to low volume of data.

As an example, during a voluntary or involuntary radio silence, occurring throughout the whole network or part of it, numerous messages can be received by the supervisory equipment at the end of the radio silence. A radio silence corresponds with a stop of message emission and reception during a time interval. This event can take place, for instance, in military applications. When the network returns to normal operation after the radio silence, the supervisory equipment must process thousands of messages arriving in mass all at the same time. Events such as intrusions could have occurred during the radio silence, which must be detected afterwards.

At the present time, correlators are not developed to meet these requirements. Therefore, they can make wrong decisions. In fact, all messages arriving at the same time at the entrance of the correlator can be received out of order. This has as consequence that if the correlator takes into account the reception time of a message, it risks making a bad decision or not making a decision, while in fact it should have generated an action in order to ensure the reliability of the data transiting through the network.

SUMMARY OF THE DISCLOSURE

The invention resolves the aforementioned disadvantages.
The object of the invention is a process for reliabilisation of the supervision of a synchronized network for administering the generation of alarms.

Furthermore, the process comprises:
  acquisition of a set of events by a receiving device, said each event comprises a time stamp corresponding with the emission time of said event;
  storage of events received by the receiving device;
  storage of at least one predefined scenario comprising a first sequence of events to be received in a time interval threshold and a first condition to be satisfied;
  detection of at least part of a second sequence of received events similar to the first sequence;
  determination of a second emission time interval of the second sequence between:
    the oldest emission time of the time stamped events and;
    the most recent emission time of the time stamped events, of the second received sequence corresponding with the first sequence of the predefined scenario;
  verification that the first scenario condition is satisfied in function of the determined emission time interval, the time interval threshold of the scenario, the received first sequence and second sequence, and
  generation of a second network status message when the first scenario condition is satisfied.

One advantage of determining the time interval based on the event emission time, instead of the reception time, is that potential network perturbations or dysfunctions of supervision messages/events can be taken into account during the verification of the scenario condition. It is obvious that the emitted events should have been received in a given order and time interval. A gap is an indication of a network incident or a quick disconnection of a user.

Advantageously, the first condition to be satisfied is verification that the emission time interval is smaller than or equal to the time interval threshold of the scenario.

One advantage of the method of the invention is that it improves the generation of true alarms triggered during monitoring operations of a data network. The improvement is the result of comparing the emission times of the emitted supervision events/messages. Because of this, the algorithm is representative of the factual reality of the events occurring in a network station.

In one implementation mode, the likeness of a received sequence of events with the first scenario sequence comprises comparing the number of common events between the received sequence and the scenario sequence.

Advantageously, a likeness criterion can comprise comparing the number of common events between the first and the second sequence. In general, the correlator compares events of a certain type. The type can be understood as the function of the event, why it was emitted.

Advantageously, a first reception time interval is determined when the method detects a likeness, the first time interval is determined between:
  the oldest reception time of the received time stamped events and;
  the presumed most recent reception time of the received time stamped events, whereby the presumed most recent time is deduced from the time interval threshold and the first sequence following the detection of a likeness, the method includes also:
  a second condition to be satisfied comprising verification that the second sequence is not completely received in the first time interval.
  generation of a first status message of the network when the second condition of the scenario is satisfied.

Advantageously, the second status message corrects the status of the network modified by the first status message.

Advantageously, the modification of the network status is obtained by suppression of the first status message by generating the second status message.

When the first status message is a first alarm, the correction of the network status can comprise generating a second status message of the network or the suppression of the first alarm.

According to the implementation modes, the generation of the first alarm is aimed at preventing an operational anomaly relative to the receipt of events which should have been received by the correlator. The method of the invention cancels or discontinues this first alarm when the sequence is in reality well received upon expiration of a time interval longer than the first reception time interval. The sequence is defined "well received", when the difference between the emission time of the oldest event of the second sequence and the emission time of the most recent event of the second sequence is smaller than the time interval threshold of the scenario stored in the correlator.

According to the implementation modes, in addition to the number of sequence events and the threshold time interval a scenario can include also:
  defining the type of each event;
  the size of the data constituting the event;
  a specific heading field;
  an event type;
  the event transmission protocol;
  the source or destination address field;
  a user identifier;
  data relative to the user profile.

Another object of the invention concerns a supervision system for a synchronized network comprising receiving equipment for receiving supervision events of said network, characterized in that it comprises a memory for storing at least one scenario comprising a first sequence of supervision events in a first time interval and a condition (first condition or first and second conditions) to be satisfied.

Furthermore the computer:
  compares based on a likeness criterion: the second sequence of received events with at least the first sequence of the predefined scenario, and;
  extracts data fields from the received time stamped events corresponding with emission times and compares said fields of different events in order to determine the emission time interval of the second sequence;
  verifies that the first scenario condition is satisfied in function of the determined emission time interval, the scenario time interval threshold, the first and second sequence of events received;
  generates a second network status message when the first scenario condition is satisfied.

According to the implementation modes, the status message is:
  either an alarm message;
  or a message intended to cancel a false alarm already issued following the reception of a complete or partial second sequence.

BRIEF DESCRIPTION OF THE DRAWINGS

Other characteristics and advantages of the invention will result from reading the following detailed description, with reference to the attached figures, which illustrate.

DETAILED DESCRIPTION OF THE DISCLOSURE

In the following description there is no difference between "an event" or "a supervision message representing an event". An "event" is therefore understood to be the reception of a certain type of message.

A "sequence", noted as SQ, means a set of messages or events received in order of reception. The order can be established by time stamping either based on the arrival time or the emission time contained in a field of a message time stamped by the source.

A sequence can be defined by a set of messages of different type, or of the same type but comprising different data fields. Messages of the same sequence can be differentiated by the attributes conventionally used for describing a message, such as for instance: size, heading, type, protocol, specific field.

A scenario, noted SC, comprises:
  a sequence SQ of events. The sequence can be ordered and each event can be characterized by one or more types, one or more source addresses or other data,
  a time interval threshold $\Delta T_s$. This sequence is compared to a detected and presumed known sequence following the analysis of likeness when the sequence or part of the sequence is received by a correlator, A "likeness criterion" is an element, or elements, used to compare a known sequence of a scenario with a received sequence of events. A criterion can be, for instance, a combination of the following elements: the number of events, their type, their order, etc. We speak more generally of "likeness" when a sequence of a predefined scenario is compared with a partial or complete sequence of received messages.

When the sequence of messages emitted by the source and received by the receiver is identical to the sequence of a scenario stored in the receiver, we say that there is correspondence between the two sequences.

Figure 1:
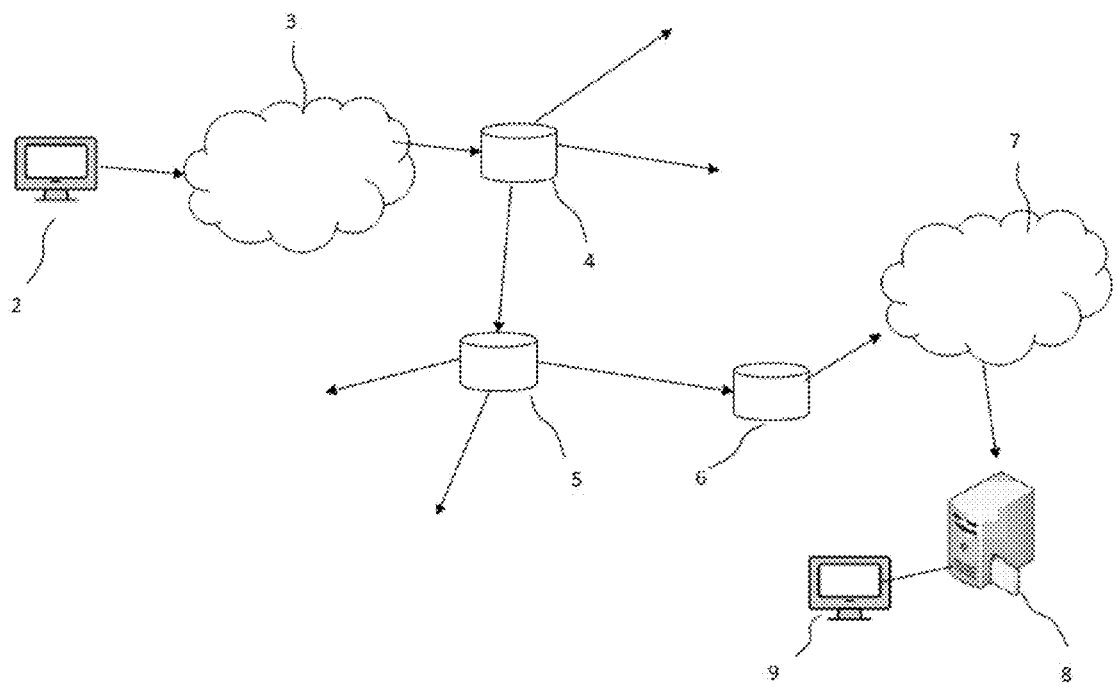
FIG. 1: a network architecture comprising a supervisory tool of the network devices.

FIG. 1 represents a synchronized network comprising different elements such as router type devices 4, 5, 6 workstations 2 of which only one is shown and supervisory equipment 8, 9. The synchronized network can comprise sub-networks 3 and 7.

In a simplified case, let's consider that a supervision center comprises a console 9 and a supervisory server 8. The server 8 comprises computing means for operating a correlator and for processing the supervision events/messages of the network. Through console 9, an operator administers and supervises the network.

Figure 2:
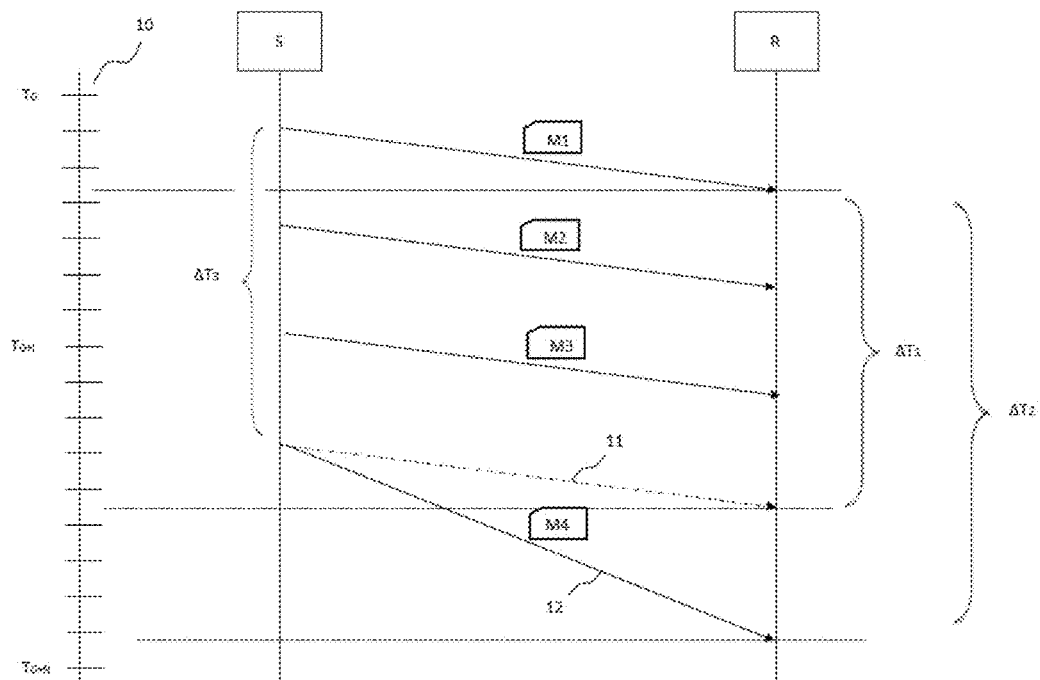
FIG. 2: a sequence of messages transiting through the network likely to activate the method of the invention.

FIG. 2 represents the transfer of messages from a source S, which is a workstation, such as station 2 in FIG. 1, towards a receiver R, relative to elements 8 and 9 of FIG. 1. Receiver R comprises therefore a correlator of the supervision center messages. For ease of use, in the following description receiver R and correlator R are mentioned without distinction.

In a synchronized network the time basis is commonly shared, it is referenced by 10 in FIG. 2.

The correlator is configured by a certain number of scenarios stored in the memory of the supervision center.

Upon receipt of an event, such as an administration message, the correlator selects one or more scenarios in function of events already received and memorized which can correspond with the events of a sequence of one or more scenarios. Upon each reception of an event the correlator refines the scenario selection by analyzing the likeness between at least one part of a sequence with another sequence. The likeness of a received sequence of messages with a scenario is determined by comparison of a number of common events between the received part of the sequence (or the totality of the received sequence) and the second sequence of a pre-defined scenario SC. Advantageously, a criterion defining a sequence of events is the number of events of the sequence. In general, the correlator compares events of a precise type. The type can be understood as the function of the event, the reason why it is emitted.

The correlator can perform several likeness analyses if a part of a received sequence seems to correspond with different sequences of different scenarios.

Once at least one scenario SC is selected, the correlator applies the first condition CD1 associated with the selected scenario SC by triggering or not triggering, or no longer triggering, an alarm representing the network status. The alarm is a status message of the particular network aimed at informing at least one person by generating an error or anomaly indicator.

A first example case can be described based on FIG. 2.
In this first example case a scenario SC1 comprises:
  four events M1, M2, M3, M4
  an interval threshold $\Delta T_s$ noted as $\Delta T_1$.
  a condition corresponding to the emission of a status message when these four messages are received in the interval $\Delta T_1$, counting from the reception of the first event of the sequence.

When the correlator receives the first event M1, it searches for the corresponding scenarios having a first event M1. If several scenarios meeting this criterion are selected, it discriminates other scenarios as other events M2 and M3 are received.

If the event M4 is received in the time interval $\Delta T_1$, then the receiver can generate a status message such as an alarm. In this case it is assumed that the event M4 is received before the arrow 11 shown in dotted line in FIG. 2.

A nominal mode of operation corresponds with the case where the four events M1 to M4 are received in a time interval smaller than or equal to the scenario interval threshold $\Delta T_s$. The nominal case requires the correlator to act by emitting an alarm when this occurs.

The sequence S1 formed by the four messages M1, M2, M3, M4 translates into, for instance, an intrusion into the network or represents, for instance, four attempts to connect with a false password via an interface of station S, etc.

The time interval threshold $\Delta T_s$ corresponds with a maximum time during which it is taken into account that if the sequence S1 is received, correlator R must emit an alarm to an operator controlling the events from console 9.

In the last case, the reception times of the events are compared with a first time interval $\Delta T_1$.

In one implementation mode $\Delta T_1$ and $\Delta T_s$ can be different, in particular when the correlator integrates a margin in the interval threshold and the interval $\Delta T_1$ representing the reception times generally observed. A sample case can be imagined in which the transmission time is integrated in the threshold $\Delta T_s$ which to a certain extent is different between the different events M1, M2, M3, M4.

In order to simplify the description of the present implementation mode let's assume that $\Delta T_s = \Delta T_1$.

In the case of FIG. 2, event M4 should have been received in the reception interval $\Delta T_s$ considering a nominal transmission time, in other words, for instance, a transmission time calculated based on the average. The nominal transmission time can also be chosen based on a case representative of a maximum transmission time observed over a certain number of events in the operational conditions of a non-perturbed network. Now, because of a network incident for instance, the transmission time 12 of event M4 causes M4 to be received in a reception time interval $\Delta T_2$ greater than the time interval threshold $\Delta T_s$.

The delay in the reception of event M4 has as consequence that the alarm which should have been generated is not generated.

Nevertheless, event M4 was emitted at the source in emission time interval $\Delta T_3$, in other words from the workstation S. In the case of FIG. 2, the emission time interval $\Delta T_3$ can be equal to or smaller than the time interval threshold $\Delta T_s$, in other words the gap between the emission of event M1 and event M4 is equal to the time interval threshold $\Delta T_s$.

A network incident occurred delaying the reception of the last event M4 defining the sequence S1. Based on an analysis by correlator R of the events received according to their arrival time, and if this network incident had not taken place, an alarm would have been generated by said correlator R.

In this way, correlator R would have missed a potentially important event such as an intrusion. This event would not have been displayed on operator's console 9.

This hypothetical case can occur, for instance, when a user disconnects from the network when the event M4 is about to be emitted but is not emitted. When the user reconnects to the network, for instance from his place a few hours later, the event is sent to receiver R but received outside the time window defined by the time interval threshold $\Delta T_s$, in other words the window $\Delta T_2$.

With the method of the invention, the correlator takes into account the emission time which is time stamped in a field of the event emitted by source S and received by receiver R. The time stamped emission time contained in the event corresponds with the emission time which is time stamped when the event is emitted by the source S.

The method of the invention takes into consideration the time stamped field of emission of the emitted events in order to make a decision a posteriori of the elapsed time interval $\Delta T_1$.

When message M4 is received late, the correlator R determines the emission interval $\Delta T3$ corresponding with the interval between the emission time of message M4 (the last event of the sequence) and the emission time of message M1 (the first event of the sequence). In this way, according to the first status condition CD1 associated with the scenario, a warning or alarm could be generated or not, even in case of late reception of message M4 because the emission times of the messages are compared and not the receipt times.

An important aspect of the method relates to the likeness analysis of a sequence during reception, but which is not completely received. The messages/events M1, M2, M3 are stored with the emission times of said messages. A timer starts to increment from the moment message M1 is received. The correlator will take into consideration the first condition CD1 associated with the scenario so that if message M4 is received it is sufficient:
    to verify that the sequence S1 is received completely and;
    to determine the emission time interval starting from the timer of the sequence M1 to M4 to deduce whether the sequence is received within the time interval threshold.

This involves comparing the time interval $\Delta T_3$, defined by the emission times of the messages, the oldest and the most recent of the sequence, with the threshold $\Delta T_s$ predefined in the correlator for a given scenario.

With the method of the invention, messages not received in sequence of origin can be reordered in the origin sequence order. The emission times provide the order in which the messages must be received.

In one implementation mode, the method of the invention allows for configuring a delay beyond which one or more events missing in a presumed expected sequence are no longer expected. This involves defining a maximum acceptable time delay from the viewpoint of receiver R during which it will take into account the event M4 for instance, even if it is sent correctly in the time interval $\Delta T_3$ determined based on the emission times. This solution offers a compromise taking into account network problems during a certain time and then no longer considering them after a certain time.

A second example can also be described based on FIG. 2 and substantiated by another interpretation. In this second case, a second condition CD2 associated to scenario SC is verified in addition to the first condition CD1.

A first time interval $\Delta T_1$ of the reception time is determined when the process detects a likeness starting from the reception of at least one event M1. The first time interval $\Delta T_1$ is determined between:
    the oldest reception time of the received time stamped events and;
    the presumed most recent reception time of the received time stamped events.

In this case, the presumed most recent time is deduced from the time interval threshold $\Delta T_s$ and the first sequence S1 following the detection of likeness. As in the first example, it is possible that $\Delta T_s$ and $\Delta T_1$ are different, but they are by preference identical for implementation simplicity of the method. This is the case in the following detailed implementation mode.

A second condition CD2 is based on the reception of a part, noted pS2, of the second sequence S2 while the first condition CD1 is based on the reception of the second sequence S2 entirely.

The second condition CD2 requires the correlator to generate a warning if it does not receive all events M1 to M4 of the first sequence S1 defined by scenario SC in a first time interval $\Delta T_1$ smaller than or equal to the interval threshold $\Delta T_s$ associated with said scenario SC. This operational mode provides, for instance, active verification that a function is operational. In fact, this functionality brings the case in line with the logic: "as long as the messages are received suitably on time, then everything is fine". This first interval $\Delta T_1$ corresponds with the incrementing of a counter from the reception of the first event M1 of the sequence. As soon as the first interval $\Delta T_1$ exceeds the threshold interval $\Delta T_s$, the correlator can generate a network status alarm $M_{ET}$.

If the emission time interval $\Delta T_3$, determined upon receipt of the totality of the second sequence S2, is smaller than or equal to the interval threshold $\Delta T_s$, the first condition CD1 requires the correlator to not, or no longer, generate an alarm if the alarm has not yet been emitted or to correct the first emitted alarm. A correction can consist in the emission of a second status alarm aimed at correcting the network status.

Considering then the case of FIG. 2, where the configuration of the correlator is different in function of the selected scenario: an alarm is generated if less than four messages (normally expected after analysis of likeness) are received in a predefined time interval $\Delta T_1$. After the first time interval $\Delta T_1$ is elapsed, an alarm is generated when only three events M1, M2, M3 are received, constituting a part of the second emitted sequence, of the four events M1, M2, M3, M4 defining the first expected sequence S1.

If the event M4 is received after the time interval threshold $\Delta T_s$ the alarm will be already generated. Event M4 can be received late for several reasons such as for instance a problem of network congestion or disconnection of the station followed by reconnection.

In a variant of this implementation mode, the alarm can be generated if only M1 and M2 are received without that M3 and M4 are received in the predefined time interval. Other configurations could bring about the emission of an alarm such as for instance reception of M1 only. In function of the selected scenario, correlator R is therefore capable of recognizing the presumed expected sequence:
  either because it must be received regularly and because non-receipt of a sequence must be reported,
  or because part of the sequence is received and the rest of the sequence has not been received in a given time interval counting from the reception of the first part.

With the invention, the emission time of the events can be controlled instead of only the reception times. When the difference between the emission time of event M4 and event M1 is within the time interval threshold $\Delta T_s$ in spite of event M4 having been received late, corrective action can be taken with the method of the invention.

In this hypothetical case, the method of the invention either cancels the previously generated alarm, or generates a second alarm in order to warn the operator or a process algorithm that the first warning must not be taken into consideration.

In fact, according to the second interpretation of FIG. 2, event M4 is received after the first time interval $\Delta T_1$ which is equal to the time interval threshold $\Delta T_s$ but which was emitted in the emission time interval $\Delta T_3$. Therefore, no alarm should have been emitted by correlator R. Because of this, the emission interval between the emission time of the oldest event M1 of the sequence and the emission time of the most recent event M4 of the sequence can be determined by comparing the emission times in a time stamped field of the received events of the same sequence.

According to its configuration, the correlator can take different actions. It can, for instance, suppress the first alarm when M4 is received in an emission interval smaller than or equal to the threshold $\Delta T_s$ according to the reference emission time of the source S. Without suppressing the first alarm, it can also generate a second alarm indicating that the first emitted alarm is false.

In one implementation mode of the invention, the two states of the network supervision can be displayed on console 8. A first state reflects the events and the decision making of the correlator on the basis of the times of receptor R. A second state represents the events and the decision making, if necessary corrected, of the correlator taking into account the emission times of the received events. With this double representation an operator can take into consideration the false alarms generated by the correlator R due to anomalies of the network.

In general, the correlator R can be configured according to different parameters in order to apply a scenario directing the actions to be taken when a sequence S2 is received.

A predefined scenario SC includes the definition of a sequence of events, a time interval and at least one status condition. Furthermore, it can include the definition of the source or destination address fields, a user or a user profile associated with the generated events such as inherited associated rights. The scenario can also include the definition of a protocol or URL.

For instance, the scenario can define two attempts to establish a communication according to a specific protocol and not authorized from an identified fixed station. If more than 3 attempts are made to establish the communication in a period of 24 hours, then an alarm is emitted by the correlator.

This example demonstrates the fact that if the three attempts are made, it is necessary that the 3 events emitted at the supervision console 8, resulting from the attempts to establish this communication, arrive within a time interval of 24 hours.

In case of a network problem, it is necessary to be able to identify the emission times in order to raise a relevant warning.

According to one implementation mode, the first event of a sequence of a scenario activates the correlator if this first event is effectively received. The activation of the correlator corresponds with a state in which, upon receipt of the first event of a known sequence of the correlator, it carries out the following actions:
  starting of the timer;
  comparison of the expected events of the sequence and those received;
  recording of the received events corresponding with the predefined sequence.

The predefined sequences associated respectively with scenarios are stored in the correlator.

Potentially, the correlator can comprise N sequences starting with event M1 which is being received. Each of the N sequences is associated with a given time interval threshold $\Delta Ts_i$. The correlator compares the following received events with the preselected scenario sequences allowing the correlator to trigger at least one local timer of which the origin corresponds with the time field of the first event M1 of the sequence.

According to one implementation mode, the source time stamp is generated by an application of the source equipment. In another implementation mode, the emission time is generated by a proxy connected to the network and to a workstation. With this solution, the time stamping of the events in emission can, for instance, be homogenized at the level of the proxy, thus avoiding the drift of the clocks in each work station, one relative to the other.

The invention claimed is:

1. A method for reliabilisation of the supervision of a synchronized network managing the generation of alarms, characterized in that the method comprises:
  acquisition of a set of events (M1, M2, M3, M4) by the receiving equipment (R), whereby said events (M1, M2, M3, M4) comprise a time stamp corresponding with the event emission time;
  storage of the events (M1, M2, M3, M4) received by the receiving equipment (R);
  storage of at least one predefined scenario (SC) comprising a first sequence of events (S1) to be received within a time interval threshold ($\Delta Ts$) and a first condition (CD1) to be satisfied;
  detection of at least one part (pS2) of a received second sequence of events (S2) similar to the first sequence (S1);
  determination of a second emission time interval ($\Delta T3$) of the second sequence (S2) between:
  the oldest emission time of the time stamped events and;
  the most recent emission time of the time stamped events, whereby the second sequence (S2) received corresponds with the first sequence (S1) of the predefined scenario;
  verification that the first condition (CD1) of scenario (SC) has been satisfied in function of the determined emission time interval ($\Delta T3$), of the time interval threshold ($\Delta Ts$) of scenario (SC), of the first sequence (S1) and of the second sequence (S2) received, and generation of a second status message (M2ET) of the network when the first condition (CD1) of the scenario is satisfied.

2. The method for reliabilisation according to claim 1, characterized in that the first condition to be satisfied is the verification that the emission time interval (ΔT3) is smaller than or equal to the time interval threshold (ΔTs) of the scenario (SC).

3. The method for reliabilisation according claim 1, characterized in that the likeness of one received sequence of events (S2) with the first sequence (S1) of the scenario (SC) comprises the comparison of the number of common events (M1, M2, M3, M4) between a part of the received sequence (pS2) and the first sequence (S1).

4. The method for reliabilisation according to claim 3, characterized in that the likeness comprises the comparison of the type of each event received (M1, M2, M3, M4) and their order within a part of the second sequence (pS2) and the first sequence (S1).

5. The method for reliabilisation according to claim 1, characterized in that a first reception time interval (ΔT1) is determined when the method detects a likeness, whereby the first time interval (ΔT1) is determined between:
the oldest reception time of the received time stamped events and;
the presumed most recent reception time of the received time stamped events, whereby the presumed most recent time is deduced from the time interval threshold (ΔTs) and the first sequence (S1) following the detection of likeness, the method comprises:
a second condition (CD2) to be satisfied comprising verification that the second sequence (S2) is not totally received in the first time interval (ΔT1);
generating a first network status message (M1ET) when the second condition (CD2) of the scenario is satisfied.

6. The method for reliabilisation according to claim 5, characterized in that the second status message (M2ET) corrects the status of the network modified by the first status message (M1ET).

7. The method for reliabilisation according to claim 5, characterized in that the modification of the network status is obtained by suppression of the first status message (M1ET) by generating the second status message (M2ET).

8. The method for reliabilisation according to claim 1, characterized in that for a given sequence a scenario comprises furthermore: a number of events defining the sequence and the definition of the event type for each of the events.

9. The method for reliabilisation according to any claim 1, characterized in that the scenario comprises at least one of the following supplementary elements: size, type, user identifier, transmission protocol, user profile data.

* * * * *